(12) United States Patent
Verduijn et al.

(10) Patent No.: US 7,410,048 B2
(45) Date of Patent: Aug. 12, 2008

(54) CURVED SEGMENT OF A GUIDE FOR A MODULAR CONVEYOR CHAIN AND MODULAR CONVEYOR CHAIN WITH SUCH A CURVED GUIDING SEGMENT

(75) Inventors: Gijsbertus Johannes Verduijn, Terheijden (NL); Leonardus Adrianus Cornelissen, 's-Gravenhage (NL)

(73) Assignee: Rexnord FlatTop Europe B.V., GV'S-Gravenzande (NL)

( * ) Notice: Subject to any disclaimer, the term of this patent is extended or adjusted under 35 U.S.C. 154(b) by 0 days.

(21) Appl. No.: 10/538,055

(22) PCT Filed: Dec. 9, 2003

(86) PCT No.: PCT/NL03/00868

§ 371 (c)(1),
(2), (4) Date: Mar. 31, 2006

(87) PCT Pub. No.: WO2004/052760

PCT Pub. Date: Jun. 24, 2004

(65) Prior Publication Data

US 2006/0201790 A1 Sep. 14, 2006

(30) Foreign Application Priority Data

Dec. 10, 2002 (NL) .................................... 1022129

(51) Int. Cl.
*B65G 17/00* (2006.01)
*B65G 15/62* (2006.01)
*B65G 15/02* (2006.01)
(52) U.S. Cl. ...................................... 198/852; 198/841
(58) Field of Classification Search ................. 198/841, 198/852

See application file for complete search history.

(56) References Cited

U.S. PATENT DOCUMENTS 1,939,862 A * 12/1933 Preble ........................ 198/841

(Continued)

FOREIGN PATENT DOCUMENTS

DE  89 01 563 U  7/1989

(Continued)

OTHER PUBLICATIONS

International Search Report corresponding to PCT/NL2003/000868, under date of mailing of Apr. 13, 2004.

*Primary Examiner*—Mark A Deuble
(74) *Attorney, Agent, or Firm*—Quarles & Brady LLP

(57) ABSTRACT

A guide bend segment (30) for a modular conveyor chain, comprising a profile from plastic material with a substantially flat upper side (31) extending along an axis proceeding in a curved manner with a guide face in which at least one guide is formed for guiding the modules of a modular conveyor chain, in which profile, adjacent the guide, magnets (37A, 37B) are included for pulling body parts of successive modules (1) of the chain to be guided against the upper side through cooperation with hinge pins (25) of the modular conveyor chain, wherein the at least one guide comprises two grooves (32A, 32B) proceeding in the longitudinal direction of the profile, so that the profile, adjacent the guide plane at the location of the guide has a substantially E-shaped cross section with a central projection (33) located between the grooves and legs located outside the grooves, on an inside bend side and an outside bend side of the projection, respectively, and that in the legs (38A, 39B), magnets are included.

22 Claims, 7 Drawing Sheets

U.S. PATENT DOCUMENTS

| | | | |
|---|---|---|---|
| 4,640,410 A * | 2/1987 | Palmaer et al. | 198/867.15 |
| 4,643,298 A * | 2/1987 | Wallaart | 198/805 |
| 4,823,939 A * | 4/1989 | Langhans et al. | 198/805 |
| 5,127,515 A * | 7/1992 | Damkjaer | 198/831 |
| 5,586,644 A * | 12/1996 | Coen et al. | 198/853 |
| 5,697,492 A * | 12/1997 | Damkjær | 198/852 |
| 6,085,896 A * | 7/2000 | van Zijderveld | 198/841 |
| 6,209,716 B1 * | 4/2001 | Bogle et al. | 198/852 |
| 6,253,911 B1 * | 7/2001 | Layne et al. | 198/852 |
| 6,364,094 B1 * | 4/2002 | Alstmar | 198/852 |
| 6,386,355 B1 * | 5/2002 | Willems | 198/852 |

FOREIGN PATENT DOCUMENTS

| | | |
|---|---|---|
| DE | 43 48 505 A | 5/1995 |
| EP | 0 159 074 A | 10/1985 |

* cited by examiner

CURVED SEGMENT OF A GUIDE FOR A MODULAR CONVEYOR CHAIN AND MODULAR CONVEYOR CHAIN WITH SUCH A CURVED GUIDING SEGMENT

CROSS-REFERENCE TO RELATED APPLICATIONS

This application claims priority to International Patent Application PCT/NL2003/000868 filed 09 Dec. 2003, which claims priority of NL application 1022129 filed 10 Dec. 2002.

The invention relates to a guide bend segment for a modular conveyor chain, comprising a profile from plastic material with a substantially flat upper side extending along an axis proceeding in a curved manner, with a guide face in which at least one guide is formed for guiding the modules of a modular conveyor chain, in which profile, adjacent the at least one guide, magnets are included for pulling the modular conveyor chain to be guided against the guide face.

The invention further relates to an assembly of a guide bend segment of the type mentioned in the opening paragraph and at least one modular conveyor chain, comprising a series of successive modules from plastic material, each of which is provided with a body part bearing a conveying face and each of which is provided with hinge holes, while the modules are hingedly coupled with the aid of hinge pins from magnetic or magnetizable material, reaching through the hinge holes. Successive modules can, each time, pivot relative to each other around an axis located in or along the conveying plane and extending substantially transversely to the conveying direction. As a result, the chain can be guided around a sprocket wheel. The hinge pins are included with clearance between the coupled hinge loops, so that, further, successive modules can each time pivot relative to each other around an axis extending substantially transversely to the conveying plane. As a result, the chain can be guided along a bend in a flat plane.

Such a guide bend segment is generally known and is used for guiding conveyor chains of the above-mentioned type along a bend in the conveying path. The row of successive modules of the conveyor chain then forms an articulated conveying surface which, with the aid of the bend segment, can be moved forward over a curved portion of a guide path. At the location of a bend in the conveying plane, the guide path is then built up from one or more successive guide bend segments. Usually, the bend segments connect to a part of the guide path running straight which is formed, for instance, by a number of parallel running wear strips on which and between which the successive modules of one or more conveyor chains are guided. The bend segment can be provided with run-in and run-out parts, running straight, and can have a constant or varying curvature. Usually, a conveying path comprises a number of guide paths proceeding side by side, each guiding a modular conveyor chain, so that an articulated conveying face is formed which is built-up from a number of chain tracks. A bend in the guide can be formed by one or more guide bend segments placed one behind the other in conveying direction. Each bend segment can then be provided with a number of guides corresponding to the total number of chain tracks to be guided, but, at the location of the bend, the guide path can also be composed of a number of guide bend segments disposed side by side, so that the total number of guides equals the number of tracks of chain.

With the known guide bend segment, the guide is formed as a single groove which is included in the top side of the profile and which extends in longitudinal direction of the profile, so that adjacent the guide face, at the location of the guide, the profile has a substantially U-shaped cross section. The central groove serves for including therein connecting blocks provided below body parts of the successive modules, which connecting blocks are provided with cooperating hinge loops which are coupled with the aid of hinge pins. Each of the modules of the associated conveyor chain comprises a thin, plate-shaped body part whose top side forms the conveying surface.

In order to prevent the conveying face from tilting about its longitudinal axis when negotiating a bend, a number of magnets is included in the guide profile for pulling the underside of the body parts of the chain to be guided against the top side of the guide, through cooperation with the hinge pins. Preferably, the magnets are of the permanently magnetic type and are preferably spaced apart along the axis of the profile. The magnets are then provided directly below the bottom of the guide groove. Optionally, the magnets can be placed in pairs with their top sides at the location of the bottom of the groove, on both sides of the groove. The pairs of magnets can then be connected by means of a closing plate.

Advantages of the known guide bend segment are a relatively large wear surface between chain and bend and a relatively limited tendency to tilting of the modules around their longitudinal axis. Disadvantageous of the known guide bend segment is that the modules, when negotiating a bend, sometimes produce sounds in that they oscillate about an axis substantially transversely to the conveying surface.

The invention contemplates a guide bend segment of the type mentioned in the opening paragraph with which, for as much as possible, the advantages mentioned are maintained while obviating the drawbacks mentioned.

To this end, the guide bend segment according to the invention is characterized in that the at least one guide comprises two grooves proceeding in the longitudinal direction of the profile, so that, adjacent the guide face, at the location of the guide, the profile has a substantially E-shaped cross section with a central projection located between the grooves and legs located outside the grooves at an inside bend side and an outside bend side of the projection, respectively, and in that magnets are included in the legs.

The modular conveyor chain for cooperation with the magnet bend segment is characterized in that the chain modules are each provided with a substantially sheet-shaped body part, provided with a conveying face located at an upper side of the body part, with hinge holes included in the body part between upper and underside of the sheet, and with two projections provided at an underside of the body part, while sliding faces located at the sides facing each other of the projections, together with a sliding face located between the projections at the underside of the body part, form a longitudinal guide with substantially U-shaped cross section, in that the projections have been provided at a distance from the sides of the body part and in that adjacent the projections, at the underside of the body part, sliding faces are located which, with sliding faces located on sides facing away from each other of the projections, each form a longitudinal guide with substantially L-shaped cross section. As a result, when negotiating a bend, at least one part of the connecting part and one leg of the U-shaped part of the longitudinal guide of the module can cooperate with at least one part of the upper side and a side face of the central projection of the guide bend segment adjoining the outside bend. Further, the lying parts of the L-shaped guide of the module can cooperate with a part of the guiding face adjoining the inside bend side and the outside bend side, respectively. As a result, oscillations of the modules when negotiating the bend can be prevented, while, when negotiating a bend, a relatively large wear surface is maintained. In particular, oscillation of the modules while negotiating the bend can be prevented in that the module can cooperate with a guide face of the central projection adjoining the outside bend.

As the magnets are included in the legs, they can extend to a point close to the guide face, while further, the height of the profile can be relatively small. As the hinge pins for coupling the successive modules are included in the body part and extend over substantially the entire width of the body part, the extremities of the hinge pins located adjacent the side faces of the module can cooperate with the magnets included in the legs of the profile. As the magnets, in this manner, are positioned closer to the side faces of the profile, they can, via the hinge pins, apply a relatively great moment against tilting, so that the risk of the module tilting can remain limited. Further, the volume of the hinge pin can be greater due to the relatively great length, so that the attractive force applied to the chain can also be greater. Because of its greater length, the hinge pin can also be designed to be thinner, while maintaining its customary pin volume. Also, when the magnets in the legs are connected by a closing plate, via the hinge pins, a magnetic circuit can be formed which is guided through magnetic non-conductive material over only a minimal distance.

It is noted that within this context, sheet-shaped is understood to mean a plate-shaped body part with a relatively great thickness, so that a hinge pin can be included between the upper and lower face of the plate.

Further advantageous embodiments of the invention are represented in the subclaims.

The invention will be further elucidated with reference to an exemplary embodiment which is represented in a drawing.

In the drawing;

FIG. 1 shows a schematic perspective top plan view of a chain module according to the invention;

FIGS. 2A and FIG. 2B schematically show perspective bottom views of the module of FIG. 1;

FIG. 3 schematically shows a side view of a number of modules, successive in a conveying direction which, with the aid of hinge pins reaching through cooperating hinge loops, are coupled to form a conveyor chain and which run around a sprocket wheel (not represented);

The Figures are only schematic representations of preferred embodiments of the invention. In the Figures, identical or corresponding parts are indicated with the same reference numerals.

Figure 1:
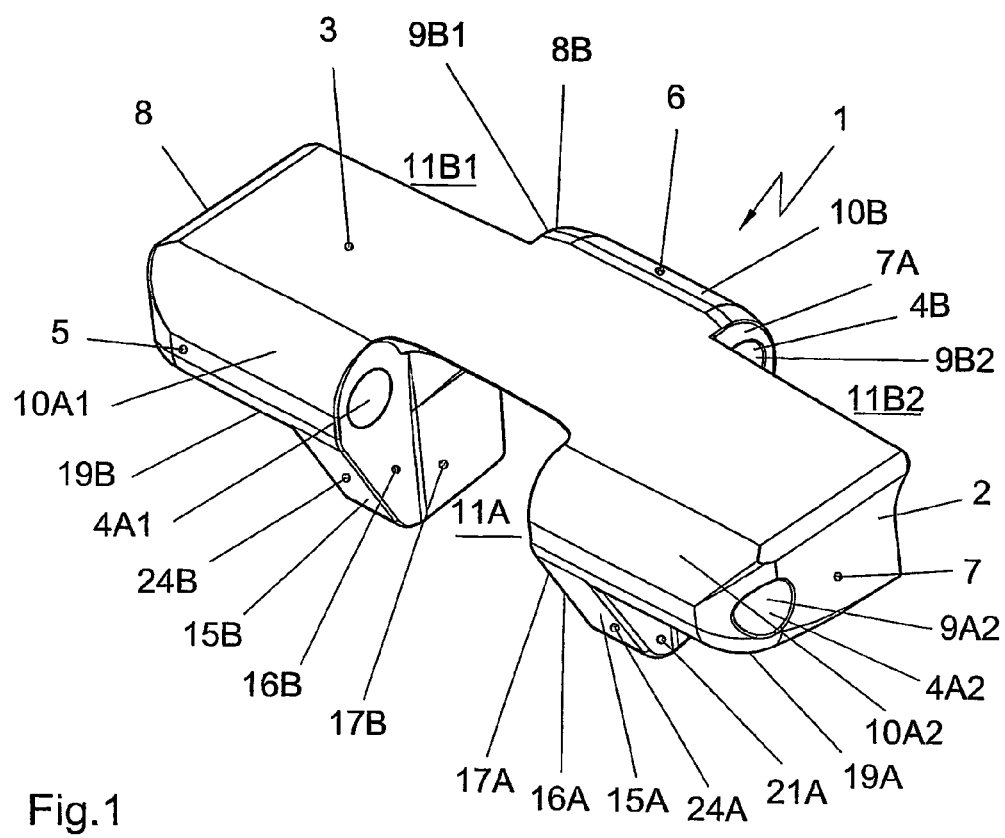
Figure 2A:
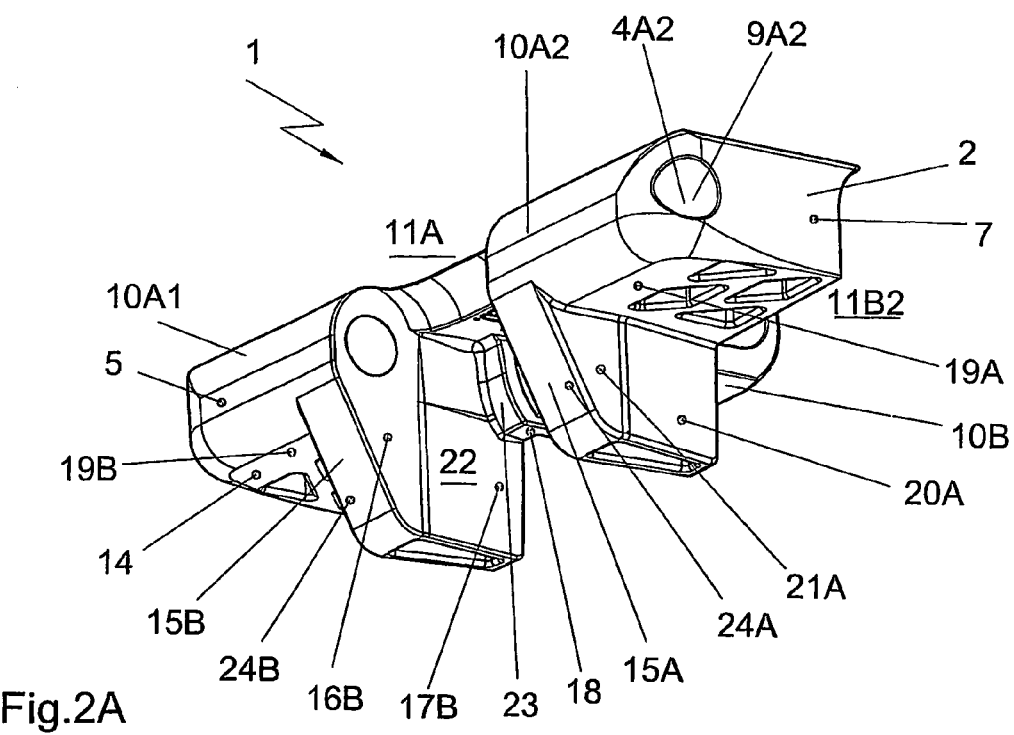
Figure 2B:
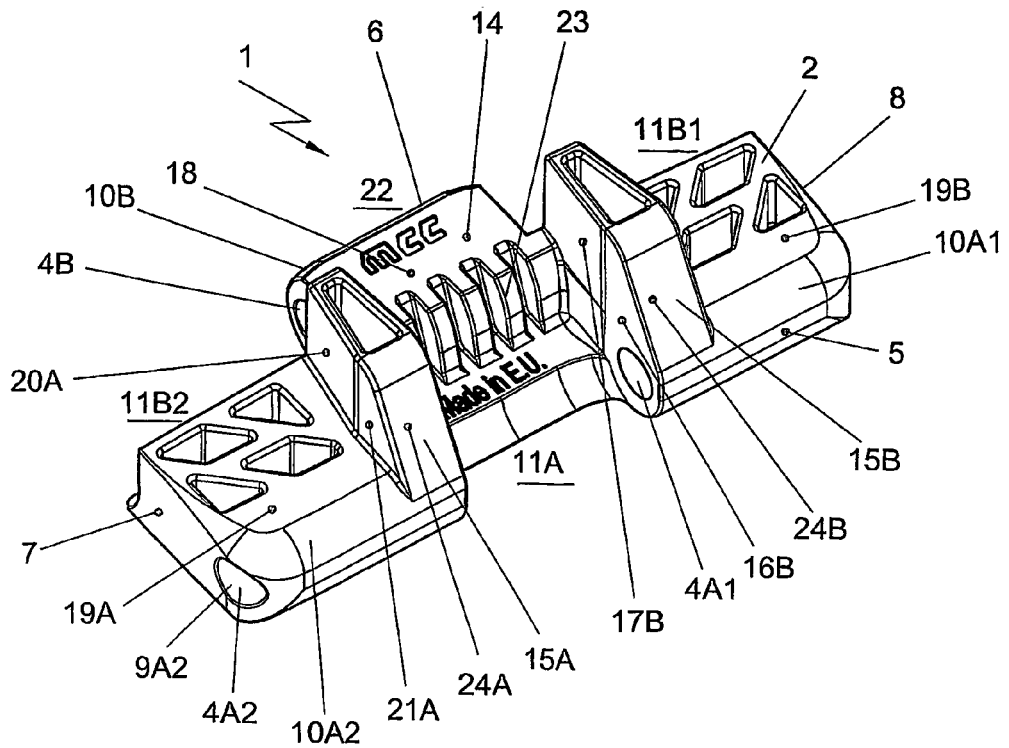
Figure 3:
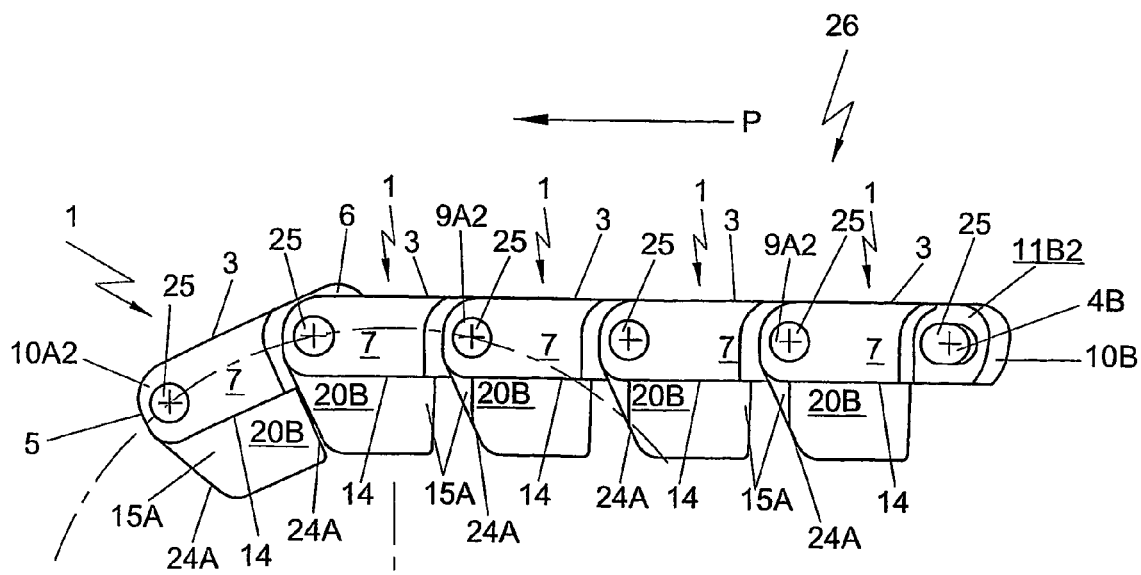

Referring to FIGS. 1-3, a chain module 1 for a modular conveyor chain is shown. The chain module 1 comprises a sheet-shaped body part 2, also indicated by the skilled person with the name "bled". The sheet-shaped body part 2 is provided with a conveying face located on an upper side 3 of the body part 2 for conveying products thereon. The conveying face can be substantially flat and be in direct contact with the products to be conveyed, but can also bear contact means such as protrusions or fingers. Further, the conveying face can not only be closed as represented in the Figure, but it can also be open, for instance in that the body part 2 is provided with a number of holes extending from the upper side 3 as far as the underside 14. The body part 2 is further provided with hinge holes 4 included in the body part. The hinge holes 4 extend along a front 5 and along a rear 6, in transverse direction between sides 7, 8 of the body part 2 of the module 1. Together, the hinge holes 4a1, 4a2, 4b extend over at least the entire width of the body part 2. Near the front 5, the sides 7, 8 of the body part 2 are each provided with an opening 9a1, 9a2 of the hinge holes 4a1, 4a2.

On the front 5, the body part 2 is further provided with two bulging hinge loops 10a1, 10a2 with a recess 11a located therebetween. On the opposite side, in this case the rear 6, the body part 2 is provided with a bulging hinge loop 10b formed correspondingly to the recess 11a. The two bulging hinge loops 10a1, 10a2 at the front 5 of the body part are provided with coaxial hinge holes 4a1, 4a2 with equal, constant cylindrical cross-section. The hinge loop 10b, formed correspondingly to the recess 11a, at the opposite side, in this case the rear 6, is provided with a slotted hole 4B lying with the longitudinal axis of the slot in the longitudinal direction of the body part 2. Adjacent the center, the cross section of the slotted hole 4b is greater than the cross section of the cylindrical holes 4a1, 4a2. The cross section increases in the direction of the openings 9b1, 9b2 located at the respective sides 7a, 8b of the hinge loop 10b at the rear 6 of the body part 2.

At an underside 14 of the body part 2, projections 15a, 15b are provided. The projections 15a, 15b are spaced apart in transverse direction to the body part 2 and extend downwardly relative to the underside 14. At the sides 16a, 16b facing each other, the projections 15a, 15b are provided on their surface with inner sliding faces 17a, 17b. The inner sliding faces 17a, 17b can extend over the entire surface of the sides 16a, 16b facing each other, but, as represented in the Figure, can also occupy only a part of the surface of the sides 16a, 16b. This has as an advantage that possible vibrations on the inner sliding faces 17a, 17b, upon cooperation with the respective sides of the central projection of a guide bend segment, can be prevented. Further, at the underside 14 of the body part 2, between the projections 15a, 15b, a central sliding face 18 is located. In this exemplary embodiment, this central sliding part 18 corresponds with the part of the underside 14 of the body part 2 located between the projections 15a, 15b which also extends over the underside of the hinge loop 10b at the rear 6 of the body part 2.

The inner sliding faces 17a, 17b located on the sides 16a, 16b facing each other of the projections 15a, 15b, together with central sliding face 18 located between the projections, form a longitudinal guide with substantially U-shaped cross-section at the underside of the body part 2.

The projections 15a, 15b are each provided at an equal distance from the respective sides 7, 8 of the body part 2. Adjacent the projections 15a, 15b, at the underside 14 of the body part 2, auxiliary sliding faces 19a, 19b are located. The outer auxiliary sliding faces 19a, 19b correspond with the parts of the underside 14 of the body part 2 located adjacent the respective projections 15a, 15b and also extend over the undersides of the forwardly extending hinge loops 10a1, 10a2.

At the sides 20a, 20b facing away from each other of the projections 15a, 15b, outer sliding faces 21a, 21b are located. In this exemplary embodiment, the outer sliding faces 21a, 21b extend over a part of the entire surface of the sides 20a, 20b facing away from each other of the projections 15a, 15b.

The outer sliding faces 21a, 21b can extend over the entire surface of the sides 20a, 20b facing away from each other, but, as represented in the Figure, can also occupy only a part of the surface of the side 20a, 20b. This has the advantage that, when the outer sliding faces 21a, 21b cooperate with the sides of the wear strips of a straight part of the guiding path, possible vibrations are reduced.

The auxiliary sliding faces 19a, 19b located adjacent the projections 15a, 15b at the underside 14 of the body part 2, together with the outer sliding faces 21a, 21b located at the sides 20a, 20b facing each other of the projections 15a, 15b, each form a longitudinal guide with a substantially L-shaped cross-section. Thus, viewed in longitudinal direction of the body part 2 of the module 1, at the underside 14, a U-shaped or channel-shaped guide, open towards the bottom, is provided which is enclosed on both sides by two mirrored L-shaped or angle-guides. In this exemplary embodiment, the inner sliding faces 17a, 17b and the outer sliding surfaces 21a, 21b extend substantially transversely to the underside 14. However, it will be clear that the two sliding faces 21a, 21b can converge or diverge relative to each other in outward direction away from the underside 14 of the body part 2, and that, independently thereof, the inner sliding faces 17a, 17b can converge or diverge relative to each other.

Between the sides 16a, 16b facing each other of the projections 15a, 15b, a space 22 is formed which is clear of obstructions for including a central projection of a guide bend segment therein. At the location of the space 22, at a part of the front 5 extending between the projections 15a, 25b, the body part 2 is provided with a recess in the body part 2 with a driving face 23. The driving face 23 is intended for cooperation with the tooth flanks of a sprocket wheel. At their basis, the projections 15a, 15b extend in longitudinal direction from the front of the module at the location of the forward reaching hinge loops 10a1, 10a2, as far as the rear 8 of the body part at the location of the recesses 11b1, 11b2, located adjacent the rearward reaching hinge loop 10b. At their front sides 24a, 24b, the projections 15a, 15b are provided with a bevel. In this exemplary embodiment, the height of the body part 2 is 12.7 mm.

Referring to FIG. 3, it is shown that with the aid of hinge pins 25, two modules 1, successive in a conveying direction indicated with an arrow P, are formed into a conveyor chain 26 with an articulated conveying face. The conveyor chain 26 can then, for instance, be formed into an endless belt which proceeds between at least two sprocket wheels, while the conveyor chain 26 can be driven with the aid of tooth flanks of at least one of the sprocket wheels, which tooth flanks cooperate with the driving faces 23. In FIG. 3 it is shown how the successive modules 1 of the conveyor chain 26 can proceed around a sprocket wheel (not shown).

The hinge pins 25 are provided with a knurled screw ending with which they have been fixed in the hinge holes 4a1, 4a2 of the forwardly extending hinge loops 10a1, 10a2. The hinge pins lock in a rearward extending hinge loop 10b of a preceding module 1. The hinge pin 25 passes through the hinge hole 4b designed as a slotted hole of the rearward reaching hinge loop so that successive modules 1 can negotiate a bend in a lying plane, in particular an articulated conveying plane formed by an upper part of an endless chain. Preferably, the pin 25 is designed from a magnetizable material such as steel, but can also be manufactured from magnetic or non-magnetic material. In this exemplary embodiment, the length of the pin is substantially equal to the width of the module 1 and, in this exemplary embodiment, is approximately 75 mm. Preferably, the length of the pin is greater than the length of a hinge pin for a conventional chain module and is, preferably, greater than approximately 44 mm. In this exemplary embodiment, the diameter of the pin is smaller than the customary diameter for chains of 8 mm, for instance approximately 6 mm. The diameter of the pin can vary over the length and can, for instance, be thicker in a central part than at the extremities for confining the pin between two loops. It is noted that the hinge pins can also be designed to have a D-shape and that it is further possible to design the hinge holes to be slightly smaller at one side of the module. As shown, the hinge pins can cooperate with one or more mating hinge loops of a module and with one or more oversize hinge loops of a successive module. However, it is also possible to connect successive modules via a "loose" pin, by including the pin in the two consecutive modules in oversize hinge loops.

Figure 4A:
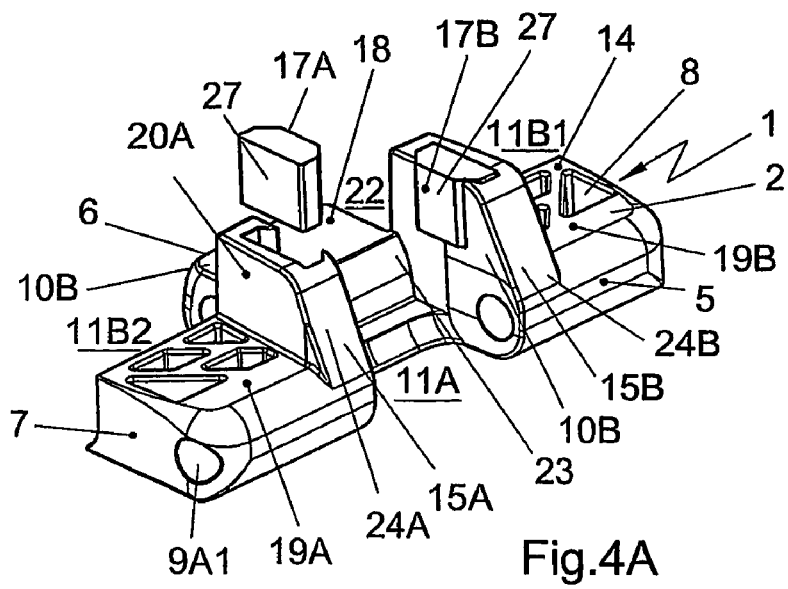
FIGS. 4A-FIG. 4D show, each time, a schematic perspective view of the underside of the alternative embodiment of the module of FIG. 1 wherein one or more sliding faces are formed by insert pieces.
Figure 4B:
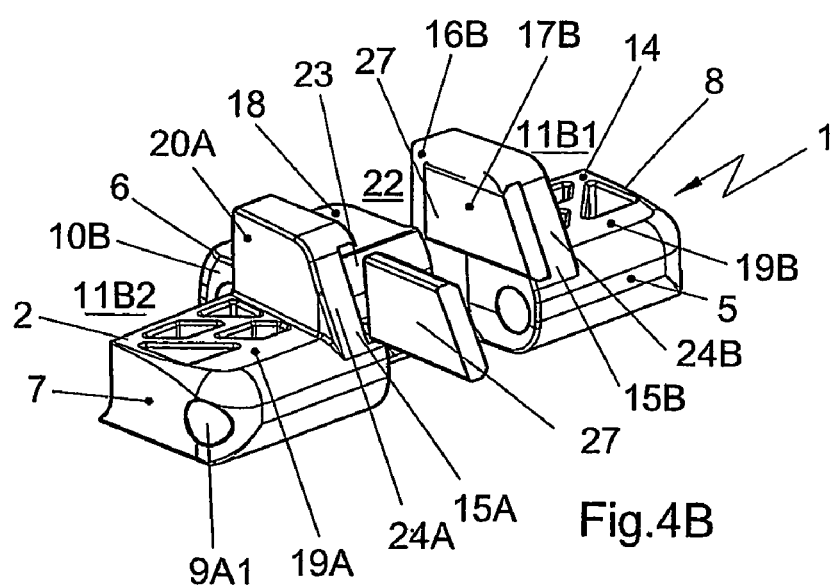
Figure 4C:
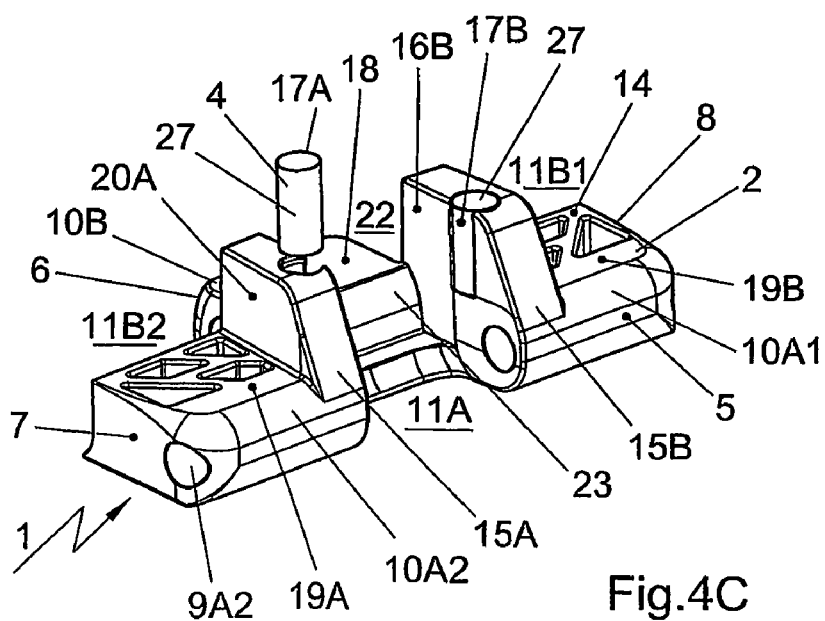
Figure 4D:
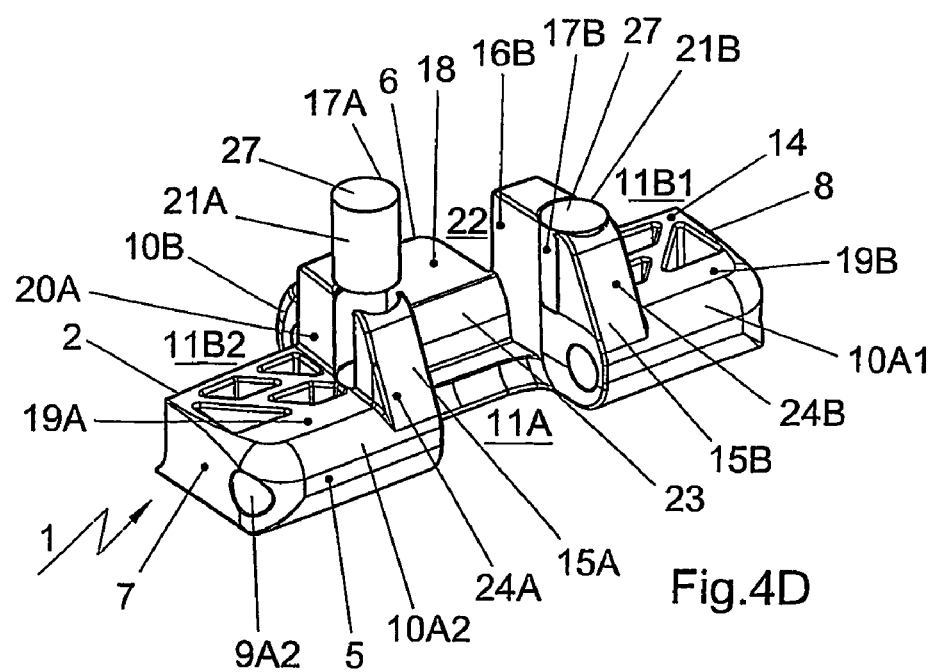

With reference to FIGS. 4a up to and including 4c, it is shown that the sliding faces 17a, 17b provided on the sides 16a, 16b facing each other of the projections 15a, 15b can be designed as insert pieces 27. The insert pieces can be designed from material with a greater resistance to wear and/or better sliding properties than the material of the module, which is designed in plastic such as POM, PBT and PA. The insert pieces 27 can be designed to be detachable and can be provided in the module 1 after injection molding. Naturally, the insert pieces 27 can also be provided in the mold cavity prior to the injection molding and can be integrally injection molded. Referring to FIG. 4d, it is shown that the insert pieces 27 can form several sliding surfaces, in this exemplary embodiment the inner sliding faces 17a, 17b and the outer sliding faces 21A, 21B.

Figure 5:
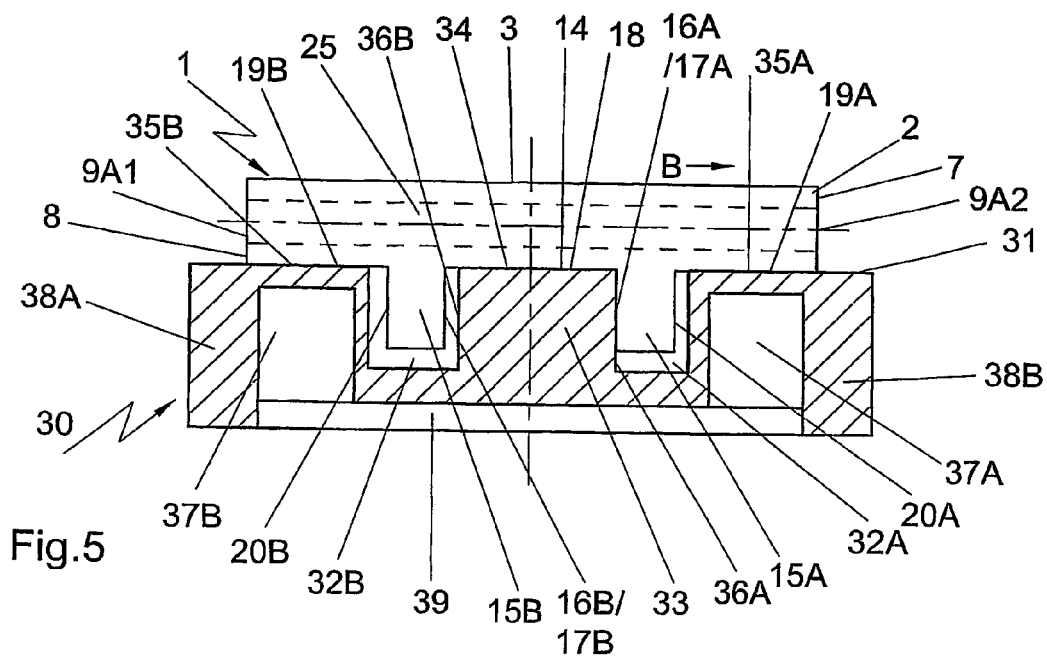
FIG. 5 shows a schematic cross-section of the module of FIG. 1 which cooperates with a guide bend segment.

Referring to FIG. 5, it is shown how a chain module 1 cooperates with a guide bend segment 30. The guide bend segment 30 is provided with a substantially flat upper side 31 in which two grooves 32a, 32b are provided in which the respective projections 15a, 15b of the chain module 1 can be included. Between the grooves 32a, 32b, a central projection 33 is formed. The top surface 31 is divided by the grooves 32a, 32b in a central face 34 located on the central projection 33 and an inner bend face 35B located at the inside bend and an outer bend face 35A located at the outside B of the bend. When negotiating the guide bend segment, at least one part of the connecting part and one leg of the U-shaped part of the longitudinal guide cooperate with at least one part of the upper side and a side face 36 of the central projection 33 of the guide bend segment 30. In this exemplary embodiment, it is shown that the outer sliding face 19a cooperates with the outside bend face 35A, that the auxiliary sliding face 19b cooperates with the inside bend face 35B, that the central face 34 cooperates with the central sliding face 18, and that the inner sliding face 17b cooperates with the outer face 36 of the central projection 33. In this manner, in the bend, an optimal support takes place, which is beneficial to the stability.

Figure 6:
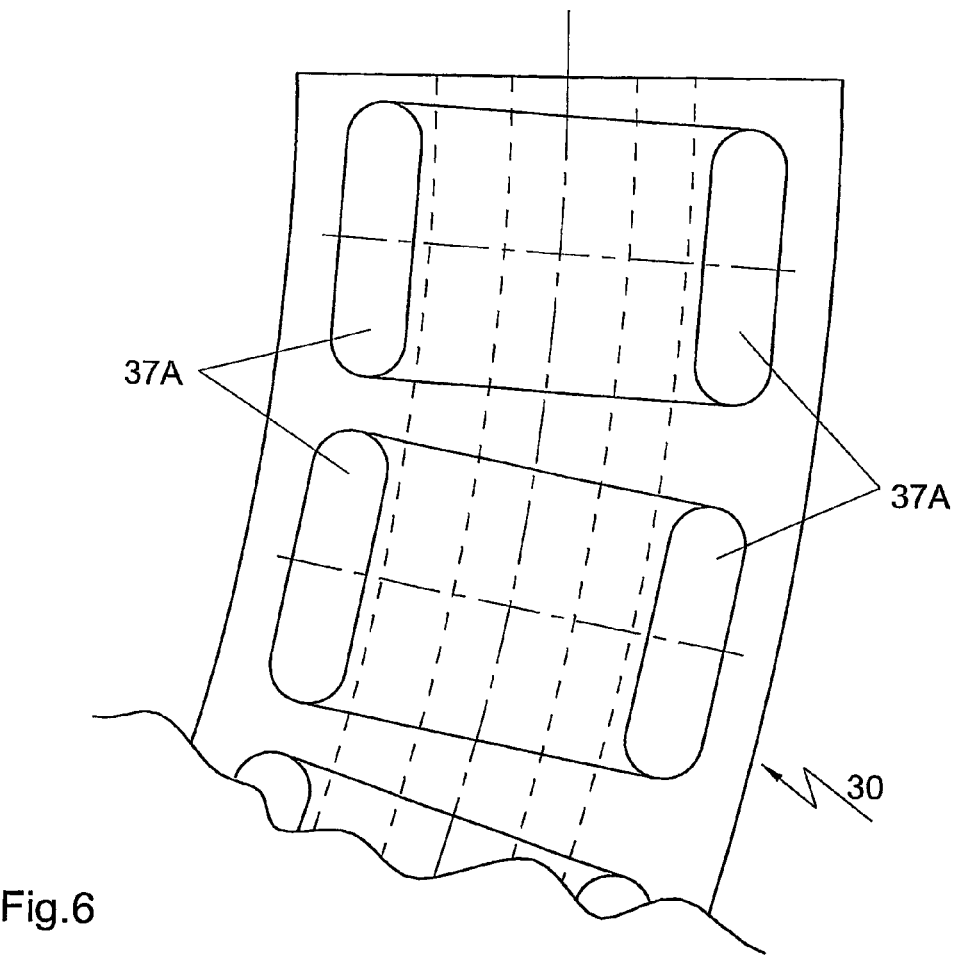
FIG. 6 shows a schematic bottom view of the guide bend segment of FIG. 5.
Figure 9:
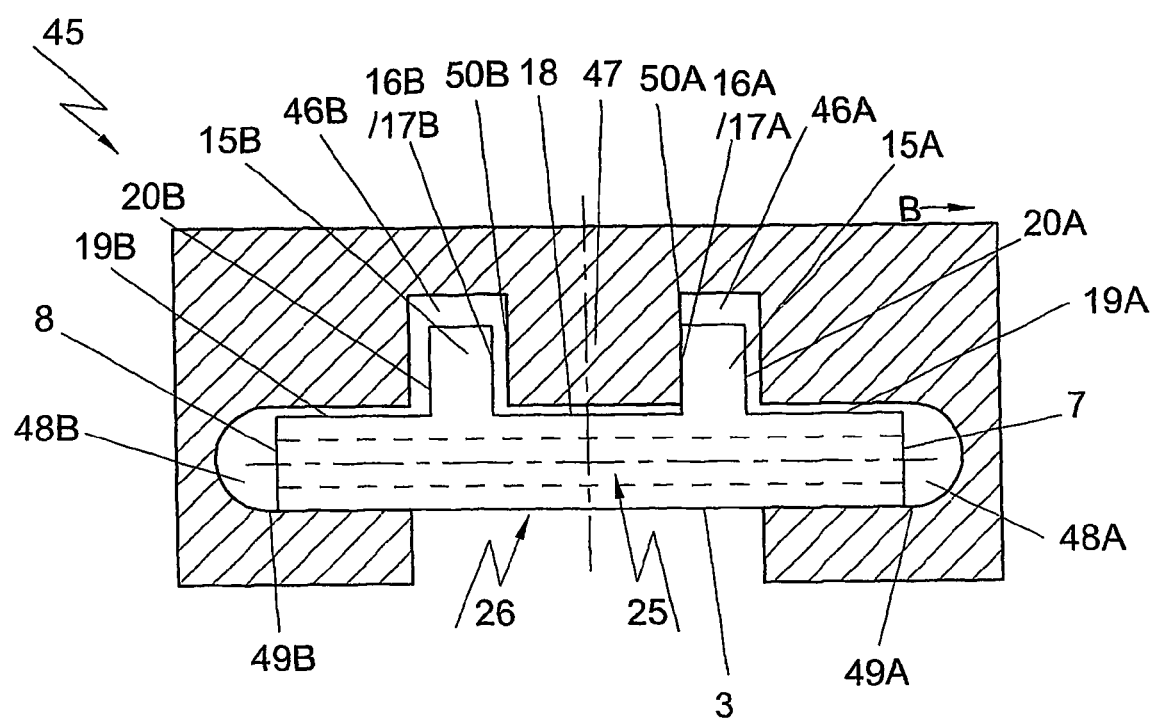
FIG. 9 shows a schematic cross section of a return part for a guide bend segment which cooperates with a module.

The bend segment 30 has a substantially lying, E-shaped cross-section. In FIG. 6, the bend segment 30 is represented in bottom view. The bend segment 30 can be provided with an integrated return part 45 for returning a bottom part of an endless chain (FIG. 9).

The bend segment 30 is provided with magnets 37a, 37b included in the legs 38a, 38b located adjacent the grooves 32a, 32b. The magnets are of the permanently magnetic type and, preferably, are designed from, for instance, ferritic magnets or neodymium magnets. The magnets 37a, 37b are connected by means of a metal closing plate 39, so that during use, the magnetic field of the magnets 37a, 37b can extend for a substantial part through a magnetic circuit through the magnets 37a, 37b and the closing plate 39 which is complemented with the aid of the hinge pins 25. With the aid of the magnets 37a, 37b, the hinge pins 25 are magnetized and the conveyor chain 26 is held in a level plane and tilting is prevented. In particular, it is advantageous that then, the magnets 37a, 37b included in the legs 38a, 38b cooperate with parts of the hinge pin 25 located adjacent the sides 7, 8 of the modules 1. As a result, when negotiating a bend, the magnets can cooperate with the part of the hinge pin located between the sides 7, 8 and the sides 20a, 20b facing away from each other and negotiating an outside bend, so that a maximum drawback moment against tilting of the module about its longitudinal axis can be supplied. As a result, the chain modules 1 are pulled by their undersides 14 against the top face 31 of the bend segment 30, such that the central sliding face 18 cooperates with the central face 34 and the respective auxiliary faces 19a, 19b cooperate with the inner face 35a and the outer face 35b.

Referring to FIG. 6, it is shown that each time, in pairs, the magnets 37a, 37b are connected with the aid of a closing plate 39 and that in longitudinal direction of the bend segment a number of pairs of magnets 37 are placed one behind the other.

It is noted that the sliding faces at the sides facing away from each other and the sides facing each other of the projections, respectively, extend substantially transversely to the underside 14 of the body part 2 of the chain module 1. In this context, as is elucidated with reference to FIGS. 5 and 6, "substantially transversely" is understood to include a situation in which a side face extends perpendicularly to the underside as well as a situation in which the sides include an angle which is some degrees greater or smaller than 90°.

Figure 7:
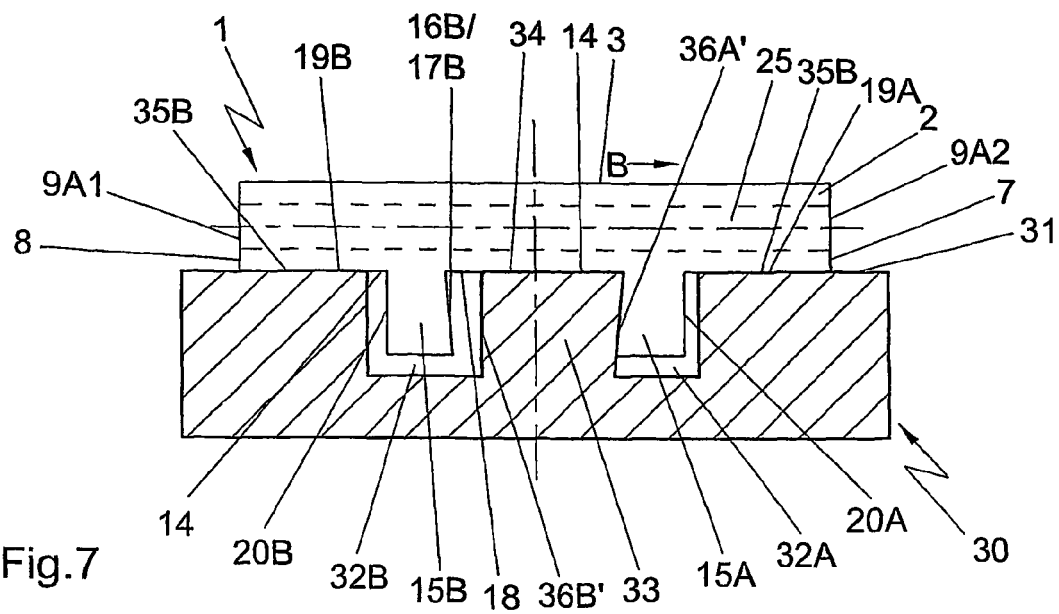
FIG. 7 shows an alternative embodiment of the guide bend segment of FIG. 5.

Referring to FIG. 7, it is shown that, when negotiating a bend segment 30, tilting of the modules 1 of the chain 26 can also be prevented by providing the central projection with one or more inclining side faces 36a', 36b', converging towards the base, and by designing the sliding faces 17a, 17b of the sides 16a, 16b facing each other of the projections 15a, 15b to converge, away from the body part 2 of the module. The central projection 33 and the clear intermediate space 22 then form, as it were, an oversize dovetail joint whose side faces cooperate when negotiating a bend. In the exemplary embodiment shown here, at the outside bend B, the side face 36b' cooperates with the inner sliding face 17b. Optionally, a base type module of the sides 16a, 16b, facing each other of the projections 15a, 15b can, at will, be provided with insert pieces which proceed in a convergent or parallel manner, depending on the shape of the central projection of the guide bend segment.

It will be clear that the magnet construction shown in FIGS. 5 and 6 and the dovetail construction shown in FIG. 7 can be used each separately. Preferably, these constructions are also used in combination.

Figure 8:
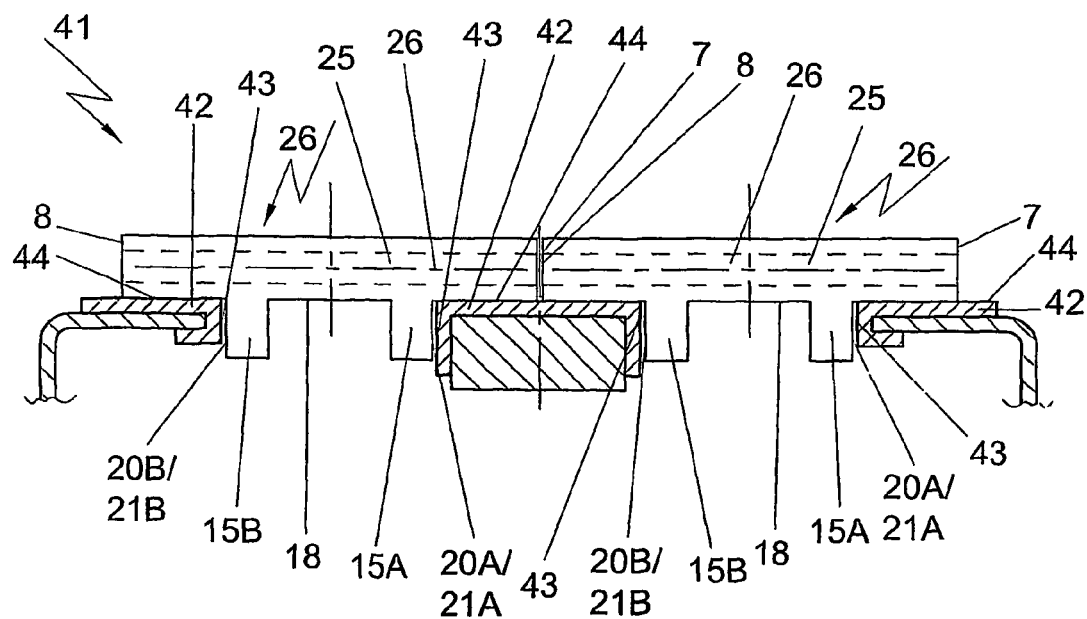
FIG. 8 shows a schematic cross-section of the two chain tracks of the module of FIG. 1 running side by side, which cooperate with a straight guide part of the guide path 1.

Referring to FIG. 8, a part 41 running straight of a guide path is shown in which two parallel chains 26 have been placed on and between parallel wear strips 42, spaced apart at a pitch of 85 mm and an intermediate space of 44 mm. The outer sliding faces 21a, 21b on the sides 20a, 20b facing away from each other of the projections 15a, 15b, i.e. the upstanding parts of the L-shaped guides then cooperate with the upstanding parts 43 of the wear strips, while the auxiliary sliding faces 19a, 19b, i.e. thae lying parts of the L-shaped guide cooperate with the lying parts 44 of the wear strips 42.

Referring to FIG. 9, a return part 45 is shown for the guide bend segment of FIG. 7. The return part 45 is used when the conveyor chain 16 is designed as an endless chain which proceeds between at least two divert wheels and wherein between the divert wheels an upper part of the chain is formed which forms a conveying surface for the products to be conveyed and, located therebelow, between the divert wheels, a lower part in which the modules 1 of the transport chain are guided back.

Usually, the return part 45 is disposed below the guide bend segment 30 and is often integrated with the guide bend segment. The return part 45 comprises a receiving space which can be run through by the successive chain modules 1 so that they are guided and supported. The receiving space comprises two standing grooves 46A, 46B for receiving the projections 15a, 15b of the chain modules 1. Between the standing grooves, in the return part 45, a central projection 47 is formed. The receiving space further comprises grooves 48A, 48B of level orientation for receiving the body parts 2 of the chain modules 1. The level grooves 48A, 48B each comprise sliding faces 49A, 49B which support the upper side 3 of the body parts 2. The standing grooves 46A, 46B each comprise guiding faces 50A, 50B provided on each side of the central projection 47A for guiding the inner sliding faces 17A, 17B at the sides 16A, 16B facing each other of the projections 15A, 15B. If the sides 16A, 16B facing each other of the projections 15A, 15B are designed having inclining inner sliding faces 17A, 17B, the central projection 47 of the return part 45 can also be designed with a correspondingly inclining guide face 50A or 50B at at least the outside bend side of the central projection 47. The return part can also be used in the part of the guide path running straight and in a part of the guide path negotiating a bend. In a part of the return part 45 running straight, naturally, the two guide faces 50A, 50B can be designed at an inclination so that they converge in upward direction and correspond with inclining guide faces 17A, 17B of the chain modules 1. It is noted that, naturally, it is possible to design the return part 45 in a different manner.

It will be clear to the skilled person that the invention is not limited to the exemplary embodiments described herein and that many variants are possible within the range of the invention as set forth in the following claims.

The invention claimed is:

1. An assembly of a guide bend and a modular conveyor chain, said guide bend including a segment comprising a profile from plastic material with a substantially flat upper side extending along an axis proceeding in a curved manner, with a guide face in which at least one guide is formed for guiding the modules of a modular conveyor chain, in which profile, adjacent the guide, magnets are included for pulling body parts of successive modules of the chain to be guided against the upper side through cooperation with hinge pins of the modular conveyor chain, wherein the at least one guide comprises two grooves proceeding in the longitudinal direction of the profile, so that, adjacent the guide face at the location of the guide, the profile has a substantially E-shaped cross section with a central projection located between the grooves and legs located outside the grooves on an inside bend side and an outside bend side of the projection, respectively, and that in the legs, magnets are included, and said modular conveyor chain comprising a series of successive modules from plastic material which are hingedly coupled with the aid of hinge pins from magnetizable material, and of which modules each is provided with a sheet-shaped body part with a conveying face located at an upper side of the body part, with hinge holes included in the sheet of the body part between upper and under side and with two projections provided at an underside of the body part, wherein sliding faces located at sides facing each other of the projections together with a sliding face located between the projections at the underside of the body part, form a longitudinal guide with substantially U-shaped cross-section, and wherein the projections are provided at a distance from the sides of the body part, and wherein adjacent the projections, at the underside of the body part, sliding surfaces are located which, with sliding faces located on sides facing away from each other of the projections, each form a longitudinal guide with substantially L-shaped cross-section, and wherein the hinge pins extend substantially over the width of the modules.

2. An assembly according to claim 1, wherein the sliding surfaces at the sides facing each other of the projections extend substantially transversely to the underside of the body part.

3. An assembly according to claim 1, wherein the sliding surfaces at the sides facing each other of the projections converge away from the body part.

4. An assembly according to claim 1, wherein on the sides facing each other of the projections, the modules of the conveyor chain are provided with insert pieces forming the sliding faces.

5. An assembly comprising:
a guide bend and a modular conveyor chain, the guide bend comprising a profile from plastic material with a substantially flat upper side extending along an axis proceeding in a curved manner, with a guide face in which at least one guide is formed for guiding the modules of a modular conveyor chain, in which profile, adjacent the guide, magnets are included for pulling body parts of successive modules of the chain to be guided against the upper side through cooperation with hinge pins of the modular conveyor chain, wherein each guide comprises two grooves proceeding in the longitudinal direction of the profile, so that, adjacent the guide face at the location of the guide, the profile has a substantially E-shaped cross section with a central projection located between the grooves and legs located outside the grooves on an inside bend side and an outside bend side of the projection, respectively, and that in the legs, magnets are included, the modular conveyor chain comprising a series of successive modules from plastic material which are hingedly coupled with the aid of hinge pins from magnetizable material, at least some of the modules of the conveyor chain including two projections having sliding faces facing each other of the projections, said projections being arranged to cooperate with the two grooves of the guide bend.

6. The assembly according to claim 5, wherein the magnets reach adjacent the guide face.

7. The assembly according to claim 5, wherein the magnets are connected by means of a closing plate.

8. The assembly according to claim 5, wherein the magnets are detachably connected to the guide bend.

9. The assembly according to claim 5, wherein the profile is composed of several profile parts.

10. The assembly according to claim 5, wherein the guide bend is provided with a run-in and/or run-out part running straight.

11. The assembly according to claim 5, wherein, on an outside bend side, the central projection is provided with the at least one side face proceeding in an inwardly converging manner from the upper side of the profile towards the base.

12. The assembly according to claim 5, wherein, on an outside bend side, the central projection is provided with a side face proceeding in an inwardly converging manner from the upper side of the profile towards the base.

13. The assembly as in claim 5, in which the sliding faces located at sides facing each other of the projections together with a sliding face located between the projections at the underside of the at least some of the modules, form a longitudinal guide with a substantially U-shaped cross-section.

14. An assembly comprising:
a modular conveyor chain comprising a series of successive modules which are hingedly coupled;
a guide bend including a profile having a guide face extending along an axis proceeding in a curved manner for guiding modules of a modular conveyor chain, said guide face including at least one guide formed for guiding the modules of a modular conveyor chain, said at least one guide including two grooves proceeding in the longitudinal direction of the profile and defining a substantially E-shaped cross section with a central projection located between the grooves and legs located outside the grooves, said central projection including at least one side face engaging at least some of said modules of the chain to guide the modules along the axis proceeding in the curved manner; and
at least some of said modules of the conveyor chain including two projections having sliding faces facing each other of the projections, said projections being arranged to cooperate with the two grooves of the guide.

15. The assembly according to claim 14, wherein the series of successive modules are formed from a plastic.

16. The assembly according to claim 14, wherein the profile is composed of several profile parts.

17. The assembly according to claim 14, wherein the guide bend is provided with a run-in and/or run-out part running straight.

18. The assembly according to claim 14 wherein, on an outside bend side, the central projection is provided with the at least one side face proceeding in an inwardly converging manner from the upper side of the profile towards the base.

19. The assembly as in claim 14, in which the sliding faces located at sides facing each other of the projections together with a sliding face located between the projections at the underside of the at least some of the modules, form a longitudinal guide with a substantially U-shaped cross-section.

20. The assembly as in claim 14, including at least one magnet fixed relative to the guide face; and the successive modules are hingedly coupled with the aid of magnetizable hinge pins, said at least one magnet pulling successive modules of the chain against the guide face through cooperation with the hinge pins of the chain.

21. The assembly according to claim 20, wherein the at least one magnet is detachably connected to the guide bend.

22. The assembly according to claim 20, in which at least two magnets are fixed relative to said at least one guide, and said magnets are connected by means of a closing plate.

* * * * *